US00RE42268E

(19) United States
(12) Reissued Patent
Hawkins et al.

(10) Patent Number: US RE42,268 E
(45) Date of Reissued Patent: Apr. 5, 2011

(54) METHOD AND APPARATUS FOR ORGANIZING ADDRESSING ELEMENTS

(75) Inventors: Jeffrey Charles Hawkins, Atherton, CA (US); Robert Yuji Haitani, Menlo Park, CA (US); Arthur C Lamb, Jr., Tiburon, CA (US)

(73) Assignee: Hewlett-Packard Company, Houston, TX (US)

(21) Appl. No.: 11/496,089

(22) Filed: Jul. 27, 2006

Related U.S. Patent Documents

Reissue of:
(64) Patent No.: 6,781,575
Issued: Aug. 24, 2004
Appl. No.: 09/668,123
Filed: Sep. 21, 2000

(51) Int. Cl.
*G09G 5/00* (2006.01)

(52) U.S. Cl. ..... 345/173; 345/169; 715/810; 455/566

(58) Field of Classification Search ..... 345/168, 345/169, 173–179; 715/700, 788, 799, 800, 715/810, 835, 841, 864; 455/566
See application file for complete search history.

(56) References Cited

U.S. PATENT DOCUMENTS

| | | | | |
|---|---|---|---|---|
| 5,180,961 | A | 1/1993 | Tsujino | |
| 5,491,784 | A * | 2/1996 | Douglas et al. | 715/810 |
| 5,502,805 | A * | 3/1996 | Anderson et al. | 715/781 |
| 5,510,808 | A | 4/1996 | Cina, Jr. et al. | |
| 5,584,054 | A | 12/1996 | Tyneski et al. | |
| 5,619,555 | A | 4/1997 | Fenton et al. | |
| 5,627,978 | A | 5/1997 | Altom et al. | |

(Continued)

FOREIGN PATENT DOCUMENTS

EP 0704788 A2 4/1996

(Continued)

OTHER PUBLICATIONS

Definition of Handheld Computer, Dictionary.com, [online] [Retrieved on Feb. 11, 2004] Retrieved from the Internet<URL:http://dictionary.reference.com>.

(Continued)

*Primary Examiner* — Regina Liang
(74) *Attorney, Agent, or Firm* — Fenwick & West LLP

(57) ABSTRACT

A method and apparatus for organizing and accessing addressing elements is herein disclosed. In many situations in use of a handheld computer, for example, it is desirable to obtain quick and easy access to addressable resources from among a list of such resources. In the case of a handheld computer including a telephone, for example, a user may wish to quickly and easily dial certain telephone numbers through use of a "speed dialing" system. An exemplary speed dialing system herein described includes a plurality of speed dial pages which can be selected by the user for display on a touch sensitive screen. Each speed dial page has an arrangement of speed dial buttons, and each speed dial button can be assigned a label, that is displayed on or adjacent the button, and a telephone number that is dialed when the button is pressed using the touch sensitive screen. The assignment of labels and telephone numbers can be arranged among the buttons by the user to aid the user in recalling where (e.g. which page and which button location) particular telephone numbers are and so enable quick and easy access by the user. These principles are similarly applicable to Internet bookmarks, for example, and software application shortcuts.

21 Claims, 9 Drawing Sheets

U.S. PATENT DOCUMENTS

| | | | |
|---|---|---|---|
| 5,672,952 | A | 9/1997 | Szepesi |
| 5,745,904 | A | 4/1998 | King et al. |
| 5,751,793 | A | 5/1998 | Davies et al. |
| 5,797,089 | A | 8/1998 | Nguyen |
| 5,797,098 | A | 8/1998 | Schroeder et al. |
| 5,809,115 | A | 9/1998 | Inkinen |
| 5,815,142 | A | 9/1998 | Allard et al. |
| 5,860,074 | A | 1/1999 | Rowe et al. |
| 5,917,905 | A | 6/1999 | Whipple et al. |
| 5,949,764 | A | 9/1999 | Yoshida et al. |
| 5,974,334 | A | 10/1999 | Jones, Jr. |
| 6,002,944 | A | 12/1999 | Beyda |
| 6,006,109 | A | 12/1999 | Shin |
| 6,016,142 | A | 1/2000 | Chang et al. |
| 6,029,072 | A | 2/2000 | Barber |
| 6,035,214 | A | 3/2000 | Henderson |
| 6,055,439 | A | 4/2000 | Helin et al. |
| 6,084,951 | A | 7/2000 | Smith et al. |
| 6,097,391 | A | 8/2000 | Wilcox |
| 6,119,179 | A | 9/2000 | Whitridge et al. |
| 6,133,916 | A | 10/2000 | Bukszar et al. |
| 6,169,911 | B1 | 1/2001 | Wagner et al. |
| 6,188,917 | B1 | 2/2001 | Laureanti |
| 6,192,118 | B1 | 2/2001 | Bayless et al. |
| 6,215,865 | B1 | 4/2001 | McCalmont |
| 6,243,452 | B1 | 6/2001 | O'Shaughnessey et al. |
| 6,285,891 | B1 | 9/2001 | Hoshino |
| 6,333,973 | B1 | 12/2001 | Smith et al. |
| 6,369,803 | B2 | 4/2002 | Brisebois et al. |
| 6,370,518 | B1 | 4/2002 | Payne et al. |
| 6,389,124 | B1 | 5/2002 | Schnarel et al. |
| 6,405,172 | B1 | 6/2002 | Baker et al. |
| 6,502,090 | B1 | 12/2002 | Räisänen |
| 6,516,202 | B1 | 2/2003 | Hawkins et al. |
| 6,557,004 | B1 | 4/2003 | Ben-Shachar et al. |
| 6,577,721 | B1 | 6/2003 | Vainio et al. |
| 6,583,806 | B2 | 6/2003 | Ludwig et al. |
| 6,973,217 | B2 | 12/2005 | Boliek et al. |
| 7,007,239 | B1 | 2/2006 | Hawkins et al. |
| 7,171,185 | B2 | 1/2007 | Matsumoto |
| 7,333,776 | B1 | 2/2008 | York |
| 2001/0034222 | A1 | 10/2001 | Roustaei et al. |
| 2002/0082043 | A1 | 6/2002 | Wilska et al. |
| 2003/0022702 | A1 | 1/2003 | Usuki et al. |
| 2003/0193923 | A1 | 10/2003 | Abdelgany et al. |
| 2004/0028192 | A1 | 2/2004 | Pelletier |
| 2005/0272462 | A1 | 12/2005 | Okamoto |
| 2006/0015819 | A1 | 1/2006 | Hawkins et al. |
| 2006/0033706 | A1 | 2/2006 | Haitani et al. |
| 2006/0121938 | A1 | 6/2006 | Hawkins et al. |
| 2006/0161858 | A1 | 7/2006 | Hawkins et al. |
| 2006/0168539 | A1 | 7/2006 | Hawkins et al. |
| 2007/0160017 | A1 | 7/2007 | Meier et al. |

FOREIGN PATENT DOCUMENTS

| | | | |
|---|---|---|---|
| FR | 2760933 | A1 | 9/1998 |
| WO | WO 99/08238 | A1 | 2/1999 |

OTHER PUBLICATIONS

Definition of Handheld, SearchMobileComputing.com, [online] [Retrieved on Feb. 11, 2004] Retrieved from the Internet<URL:http://searchmobilecomputing.techtarget.com>.

Excerpts from Handspring VisorPhone™ User's Guide, Copyright 2000, Handspring, Inc.

Excerpts from Motorola Timeport Tri-Brand Mobile Telephone Manual, Copyright 1999, Motorola, Inc.

Excerpts from Ericsson Mobile Phone 1888 World User's Guide, Copyright 1998, Ericsson Mobile Communications AB.

pdaCall (Patent Pending), www.bestnetcall.com, [online] [Retrieved on Aug. 31, 2001] Retrieved from the Internet<URL:https://www.bestnetcall.com/products/pda_call.htm>.

"Conference Calling Added to BestNet's Service Designed for Palm OS(R) Handhelds," Aug. 21, 2001, Yahoo! Finance, [online] [Retrieved Aug. 31, 2001] Retrieved from the Internet<URL:http://biz.yahoo.com/prnews/010821/latu097.html>.

United States Office Action, U.S. Application No. 11/354,414, Sep. 16, 2009, 10 pages.

United States Office Action, U.S. Appl. No. 11/354,414, Apr. 9, 2010, 12 pages.

United States Office Action, U.S. Appl. No. 11/354,414, Sep. 30, 2010, 13 pages.

* cited by examiner

Original order

| | |
|---|---|
| A | B |
| C | D |
| | |
| | E |
| F | X |

New order

| | |
|---|---|
| A | B |
| X | D |
| C | |
| | E |
| F | |

Figure 10A

Original order

| | |
|---|---|
| A | G |
| B | C |
| D | |
| | E |
| F | X |

New order

| | |
|---|---|
| A | G |
| X | C |
| B | |
| D | E |
| F | |

Figure 10B

Original order

| | |
|---|---|
| A | R |
| B | C |
| D | S |
| E | F |
| G | X |

New order

| | |
|---|---|
| A | G |
| X | R |
| B | C |
| D | S |
| E | F |

Figure 10C

METHOD AND APPARATUS FOR ORGANIZING ADDRESSING ELEMENTS

Matter enclosed in heavy brackets [ ] appears in the original patent but forms no part of this reissue specification; matter printed in italics indicates the additions made by reissue.

FIELD OF THE INVENTION

The present invention relates to the field of computer-human interfaces. In particular the present invention relates to organization of addressing elements in a computer facilitating easy navigation of the addressing elements by a user.

BACKGROUND OF THE INVENTION

Handheld information organization and communications devices are becoming increasingly popular, amongst business workers and more general users. For example, handheld computer systems such as the 3Com line of Palm handheld computers, the Handspring Visor, and the Microsoft Pocket PC have found widespread acceptance amongst people for the purpose of organizing their schedules and storing contact information. Typically, these handheld computer systems contain Personal Information Management (PIM) applications such as an address book, a calendar application, a memo application, and a To-Do list application. Such handheld computer systems are popular because they are small enough to be carried all the time, allowing constant easy access to information.

Sales research has indicated that having a simple intuitive method of accessing the stored data is one of the most important aspects of a handheld computer system. Due to its simple elegant design and efficient operation, handheld computer systems based upon the Palm Operating System (Palm OS) have captured a large proportion of the handheld computer system market. With the Palm OS, a user can select and manipulate data using a stylus on a touch sensitive screen, which permits a information to be accessed in a wide variety of ways.

One of the most important applications of handheld computer systems is to hold personal information. For example, an addressbook application is used to store and access a list of acquaintances and contact details. To satisfy consumers, it would be desirable to create new useful interfaces that allow a user to select and arrange items in such lists quickly and in a simple manner.

SUMMARY OF THE INVENTION

A method and apparatus for organizing and accessing addressing elements is herein disclosed. In many situations in use of a handheld computer, for example, it is desirable to obtain quick and easy access to addressable resources from amongst a list of such resources. In the case of a handheld computer including a telephone, for example, a user may wish to quickly and easily dial certain telephone numbers through use of a "speed dialing" system. An exemplary speed dialing system herein described includes a plurality of speed dial pages which can be selected by the user for display on a touch sensitive screen. Each speed dial page has an arrangement of speed dial buttons, and each speed dial button can be assigned a label, that is displayed on or adjacent the button, and a telephone number that is dialed when the button is pressed using the touch sensitive screen. The assignment of labels and telephone numbers can be arranged amongst the buttons by the user to aid the user in recalling where (e.g. which page and which button location) particular telephone numbers are and so enable quick and easy access by the user. These principles are similarly applicable to Internet bookmarks, for example, and software application shortcuts.

In accordance with the present invention, there is provided a method for enabling user access to actionable addresses from a computer system having a screen for displaying iconographic data and text and a user input device enabling a user to interact with the computer system using components displayed on the screen. The method includes displaying a first of a plurality of action pages on the screen, each action page having a plurality of activatable elements in a predefined arrangement, each activatable element having an assigned correspondence with a user defined label displayed with the activatable element and a user defined actionable address. Display of the plurality of pages can be controlled by the user to enable display of a second of said plurality of action pages on the screen in response to a user input through said user input device. In response to activation of a selected one of said activatable elements by a user through said user input device, the method includes executing the actionable address assigned to the selected activatable element.

In a preferred embodiment of the invention, the computer system comprises a handheld computer system with a touch sensitive screen that acts as the screen and user input device.

Preferably the assignment of labels and actionable addresses with activatable elements is user definable, such that the assignments can, by action of the user input device, be reassigned between activatable elements on the same page and between activatable elements on different pages. In the preferred embodiment the reassignment of activatable elements is achieved by a drag-and-drop operation.

In one embodiment of the invention the computer system includes a telephone, and the actionable addresses comprise telephone numbers, wherein executing the actionable address comprises dialing the telephone number assigned to the selected activatable element. In this case the method performs the functions of a "speed dialing" system for frequently used telephone numbers or the like.

In another embodiment the computer system is equipped for communication with the Internet, and the actionable addresses comprise Internet addresses, wherein executing the actionable address comprises accessing the Internet address assigned to the selected activatable element. In this case the method acts in the form of a "bookmark" system for frequently used Internet addresses or the like.

In another embodiment the actionable addresses correspond to software applications in the computer system, wherein executing the actionable address comprises initiating execution of the software application assigned to the selected activatable element. In this case the method allows easy user access to frequently used software applications.

Preferably the activatable elements are in the form of "soft buttons" or the like, which can be activated by the finger of a user on the touch sensitive screen. By having a plurality of pages, selectable by the user, each with a predefined arrangement of buttons having user assigned labels and addresses associated therewith, the user may easily recall where, in page and button position, a desired actionable address (e.g. telephone number, Internet bookmark, software application shortcut) can be located.

The present invention also provides a handheld computer system including a processor, a screen display, a user input device and communications circuitry all coupled to interoperate with one another. The handheld computer system includes a graphical user interface comprising a plurality of action pages for display on the screen, each action page having a plurality of activatable screen elements in a predetermined arrangement with each screen element being user assignable to a label that is displayed with the screen element and an actionable address that is executed upon activation of the screen element using the user input device, wherein the assignment of labels and actionable addresses to activatable screen elements can be rearranged by the user.

Preferably the screen display and user input device of the handheld computer system comprise a touch sensitive screen. In the preferred embodiment, each of the activatable screen elements comprises a button display on the touch sensitive screen that is capable of activation by the press of a finger of the user so as to execute the corresponding actionable address.

In one form of the invention the communications circuitry includes a telephone, wherein the actionable addresses comprise telephone numbers, and executing the actionable address comprises dialing the telephone number assigned to the selected activatable element.

In another form of the invention the communications circuitry includes circuitry for communication with the Internet, and the actionable addresses comprise Internet addresses, wherein executing the actionable address comprises accessing the Internet address assigned to the selected activatable element.

In another form of the invention the actionable addresses correspond to software applications in the computer system, wherein executing the actionable address comprises initiating execution of the software application assigned to the selected activatable element.

In accordance with the present invention there is also provided a speed dialing system for a mobile telephone device, the mobile telephone device having a display screen and a user input device, the speed dialing system including a plurality of speed dial display pages which are selectable by action of the user input device for display on the screen, each display page having a plurality of speed dial active elements in a predetermined arrangement, wherein each speed dial active element is displayed together with a user assigned descriptive label, and wherein each speed dial active element is assigned to a user definable telephone number that is dialed by the telephone device upon activation of the corresponding speed dial active element by use of the user input device.

Other objects, features, and advantages of present invention will be apparent from the company drawings and from the following detailed description.

BRIEF DESCRIPTION OF THE DRAWINGS

A preferred embodiment of the present invention is described in detail hereinafter, by way of example only and with reference to the accompanying drawings, in which:

FIGS. 10A, 10B and 10C are block diagrams illustrating further telephone speed dial user interface editing procedures.

DETAILED DESCRIPTION OF THE PREFERRED EMBODIMENT

A method and apparatus for organizing addressing elements is herein disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to handheld computer systems. However, the same techniques can easily be applied to other types of devices in which quick and easy access to addressable elements from amongst a list of such elements is desirable.

Figure 1:
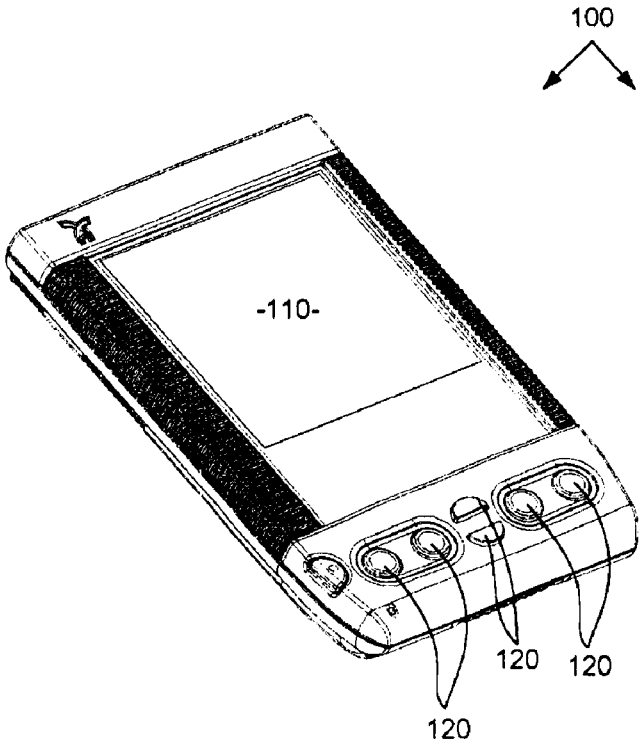
FIG. 1 is a front isometric view of a handheld computer system on which an embodiment of the present invention may be implemented.
Figure 2:
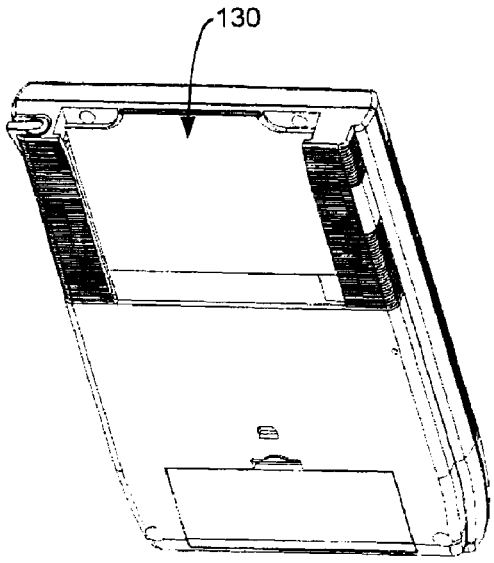
FIG. 2 is rear isometric view of the handheld computer system of FIG. 1.

FIGS. 1 and 2 illustrate a handheld computer system 100. As shown in FIG. 1, the front of the handheld computer system includes a display area 110 and several physical buttons 120. The display area includes a visual display device, such as a liquid crystal display or the like, for presenting information to the user. The physical buttons 120 can be manipulated by the user to input information to the computer system and make selections of information presented on the display device. The display device may also be covered with a digitizer pad which can be utilized by the user to enter information to the computer system using a stylus (not shown).

In operation, information from the computer system is displayed by the display device in the display area 110. The user is then able to employ the stylus to manipulate and interact with the displayed information by touching the digitizer pad. In one mode of operation the stylus can be used in the manner of a writing pen to enter characters and figures by drawing the stylus across the digitizer pad. In another mode of operation, the stylus and digitizer function like a computer mouse to operate and manipulate interactive elements on the display. For example, the computer system may present a virtual button in a location on the display that can be activated to perform a function by the user tapping the stylus on the digitizer pad at the virtual button location. The stylus can also be used to perform "drag and drop" operations in the fashion known in the use of a computer mouse. Functions of the digitizer pad can also be operated by a user's finger, such as activating a virtual button on the display.

The handheld computer system 100 also includes an expansion connector slot 130, seen in the rear view of FIG. 2. The expansion connector slot allows peripheral devices to be connected to the computer system to interact therewith. Many kinds of peripheral devices can be connected to the handheld computer system 100 through the expansion connector slot 130 including, for example, a radio cellular telephone transceiver device.

Figure 3:
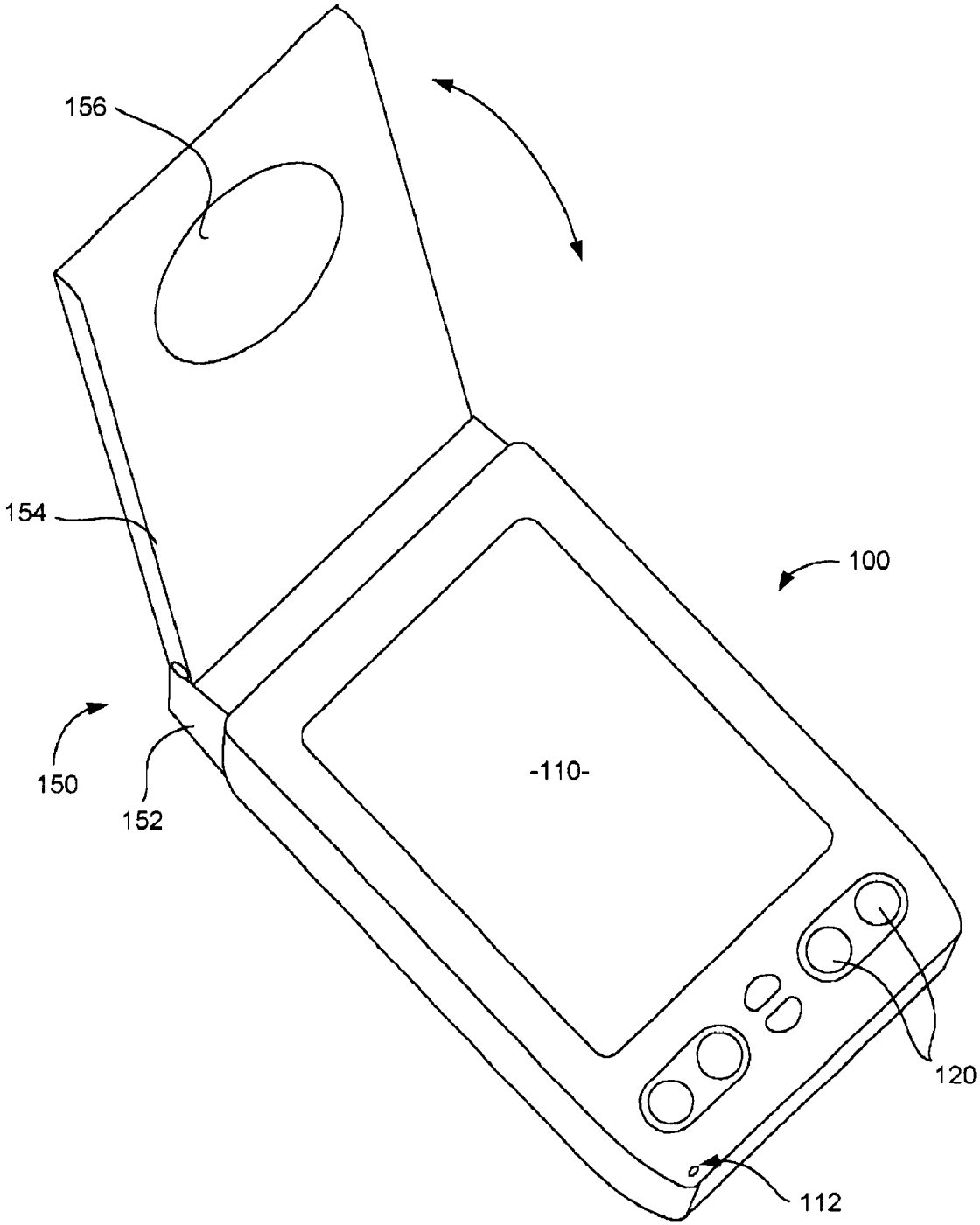
FIG. 3 is a front isometric view of the handheld computer system equipped with a radio telephone communications peripheral attachment.

FIG. 3 is an isometric view of a handheld computer system 100 as described above, with a cellular radio telephone transceiver device 150 coupled thereto by the expansion connector slot 130. The radio telephone device 150 comprises a first portion 152 that is fixed to the body of the handheld computer system and a second portion 154. The second portion 154 of the radio telephone device is hingedly coupled to the first portion 152 to allow it to pivot from a closed position where it covers the display area 110 to an open position as shown in FIG. 3. When in the open position, a speaker 156 in the second portion of the radio telephone device 150 can be held against the ear of the user whilst the user speaks into a microphone 112 provided in the handheld computer system 110.

The radio telephone device 150 includes circuitry for enabling communications with a cellular telecommunications network and processing circuitry that, together with onboard software or firmware, allows the radio telephone device to interact with the handheld computer system 100. Various aspects of a handheld computer system and interconnected cellular radio telephone are described in co-pending patent application Ser. No. 09/374,095 filed Aug. 12, 1999 and entitled "A Mobile Computer System Designed for Wireless Communication Expansion". The disclosure of that co-pending patent application is hereby expressly incorporated herein by reference.

It will be appreciated that the handheld computer system 100 and functions of the cellular radio telephone 150 operate principally under the control of computer software. The handheld computer system 100 includes a microprocessor and built-in software that provides applications for the user. The radio telephone peripheral device 150 may also include a microprocessor, together with software code and data specifically required for the phone functions. In the preferred embodiment, a computer software phone application that provides the user interface functions for the radio telephone peripheral executes on the handheld computer system microprocessor, although the software code may be permanently stored in either the handheld computer or the radio telephone peripheral. Similarly, data used by the phone application can be stored in either device, although it is preferred that acquaintance contact data and the like be stored in the handheld computer system so that it may be accessible by the user even when the telephone peripheral is not present.

Amongst mobile radio telephone users it has been found that one of the most utilized features of the mobile telephone is the "speed dial" function. A typical mobile telephone has a non-volatile storage memory for storing the names and corresponding telephone numbers for a plurality of the user's acquaintances or the like. The telephone speed dial user interface then allows the user to place a telephone call to one of the stored telephone numbers relatively quickly and easily.

Existing mobile telephone speed dial systems can operate in a variety of ways. One such speed dial system allows the user to associate a telephone number with a unique one or two digit code. The user can then dial the number by entering the one or two digit code, followed by the "SEND" key, for example, to place the speed dial call. In order for this system to be effective, the user must memorize the codes associated with the telephone numbers.

Another existing speed dial system allows the user to utilize letters associated with keys on the telephone keypad to spell out the name of the person associated with a stored telephone number. This can be a tedious process since typically three or four letters are assigned to each button on the telephone keypad, which necessitates several key presses for each of the letters in the name spelt.

Another existing mobile telephone speed dial system uses a list of names associated with speed dial telephone numbers that is displayed on the telephone screen. In this case designated telephone keypad buttons allow the user to scroll up and down the list to select the desired name and thereby dial the associated telephone number.

An implementation of the present invention provides an alternative system for arranging and accessing mobile telephone speed dial records. In particular, and embodiment of the invention is described hereinbelow in the context of a telephone application and user interface operating on a handheld computer 100 with attached cellular radio telephone 150 of the kind shown in FIG. 3 and referred to above. The system for arranging and accessing addressing elements in the described embodiment of the invention provides a speed dial system that enables fast and easy access location of stored addressing records (e.g. names and associated telephone numbers) so that a user can quickly and accurately place a call using a stored telephone number.

The speed dial system of the present embodiment implements a physical page metaphor, whereby a plurality of"pages" are each used to represent a sub-set of speed dial records. A speed dial record can be considered as an addressing element and an associated tag or label. In this case the addressing element will in most cases be a simple telephone number, although in this embodiment provision is made for additional addressing data, as is described hereinbelow. The tag or label associated with the addressing element in the speed dial record can be a person's name or other descriptive title. For example, "John", "Peter Smith", "Home" and "Office" are the kind of tags or labels that might typically be used in speed dial addressing records. Thus the speed dial record includes descriptive data (the tag or label) and addressing data (the telephone number). The descriptive data is easier for most people to remember than a string of digits, and is therefore used to access the corresponding stored telephone numbers.

Each page in the speed dial system is a software construct that allows single tap dialing access to a subset of the stored speed dial records. A Speed Dial page in the preferred embodiment includes a screen display which is presented to the user in the display area 110 of the handheld computer 100. The Speed Dial page also includes interactive functionality that allows a user to manipulate and select data represented in the corresponding screen display. In this description "pages" are described largely with reference to the layout of information and the like presented by the screen display, and the underlying functions performed as a result of user interaction with interactive elements. However, it will be appreciated that in fact the functions performed are carried out by computer software routines, or hardwired equivalents, executed by the circuitry of the handheld computer or telephone peripheral, including the generation of the visual screen displays and interpretation of user interaction with the touch-screen digitizer. The software that performs the functions is herein referred to as a Phone App. The Phone App, as mentioned, is stored in the handheld computer 100 or telephone peripheral 150, and utilizes user defined data in the form of the speed dial records which are also stored in the handheld computer or telephone peripheral.

Figure 4:
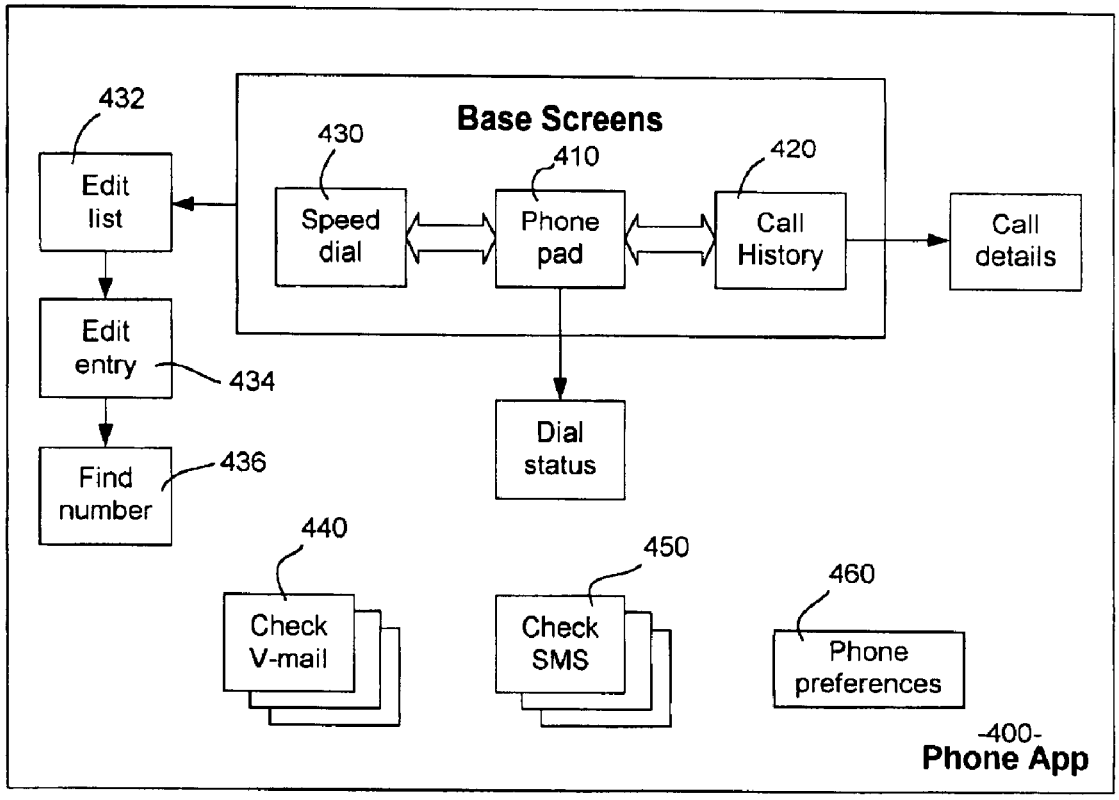
FIG. 4 is a functional block diagram of a telephone user interface software application.

FIG. 4 is a functional block diagram of the Phone App (400) indicating the main functions accessible through the user interface thereof when there are no telephone calls active. The Phone App 400 includes voice-mail and short message service (SMS) checking systems 440, 450 and a phone preferences function 460 which are not relevant to the present invention and are therefore not further discussed herein.

When there are no telephone calls active, the Phone App has three main views accessible through the user interface: a dial pad view (410), a call history view (420) and a speed dial view (430). The dial pad view 410 presents page that looks and operates similarly to a traditional telephone keypad for manual dialing of telephone numbers. The call history view 420 presents a scrollable list of the past 1000 telephone calls made and received, with the ability to dial a number from the list. The manual dial pad and call history features are also not directly relevant to the implementation of the present invention, and are not further discussed so as to avoid obscuring the invention.

The speed dial view 430 of the Phone App 400 includes five Speed Dial pages each containing ten one-touch speed dial buttons. From the speed dial view 430 the speed dial data can be entered and amended by the user through edit list (432), edit entry (434) and find number functions (436) which are described in detail hereinbelow.

Figure 5:
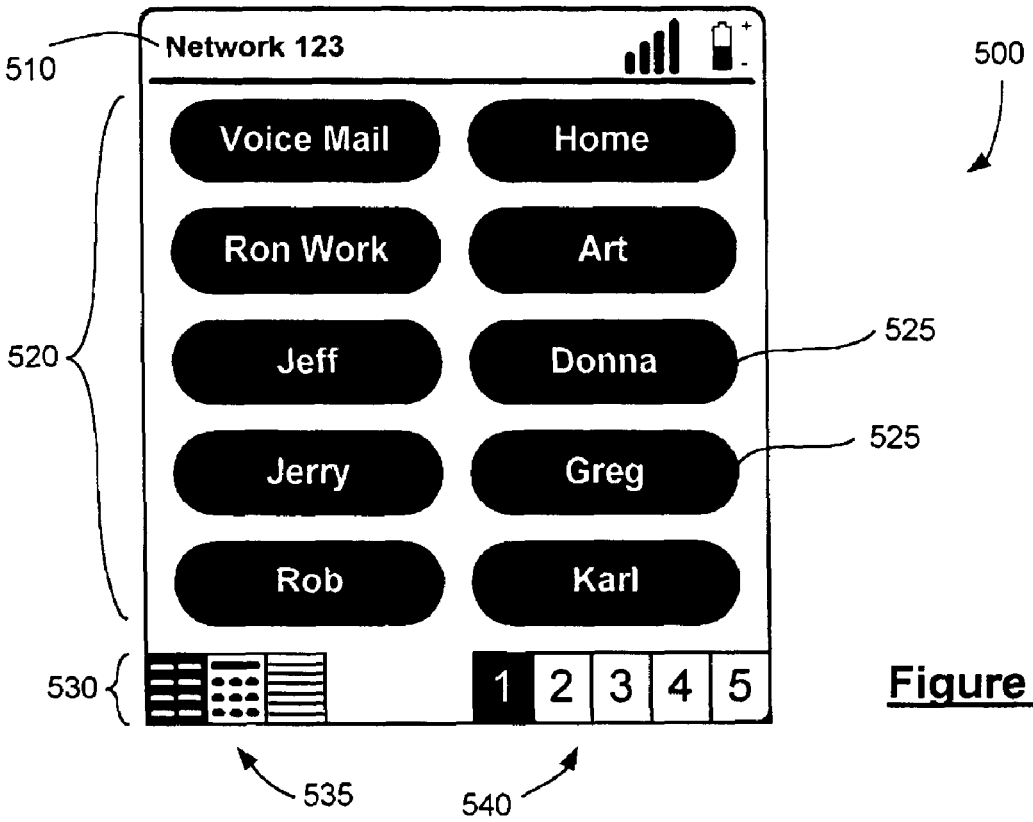
FIG. 5 is a diagram of a display arrangement for a telephone speed dial user interface.

FIG. 5 illustrates the visual presentation of an exemplary Speed Dial page 500 according to the preferred embodiment of the speed dial system. The Speed Dial page has a title bar (510) at the top of the screen and a command button area (530) at the bottom of the screen. The area (520) between the title bar and command buttons on the Speed Dial page 500 is occupied by ten speed dial screen buttons 525, arranged in two columns of five buttons per column. Each of the speed dial screen buttons 525 corresponds to a speed dial record. The speed dial record tag or label (or a portion thereof) is displayed on the screen button, and activating ("tapping") the button causes the Phone App to control the handheld computer and telephone peripheral to dial the telephone number of the corresponding speed dial record.

Three icons 535 appear at the bottom left command button area of the Speed Dial page screen 500. These represent buttons that allow the user to toggle the screen display between the three main Phone App views (410, 420, 430 in FIG. 4). The user can tap on the icons directly to move between the main Phone App views. In FIG. 5 the leftmost of the icons 535, representing the speed dial view, is shown highlighted by inverted graphic colors.

There are five small, numbered page buttons 540 to the right hand side of the command button area 530 on the Speed Dial page 500. The page buttons 540 represent the five pages of speed dial buttons available. The button corresponding to the current page is highlighted by inverted graphic colors (in this case the page illustrated being page number one). Tapping on any of the other page buttons 540 will effect display of the contents of that page (and that page button will then become highlighted).

The basic operation of the Phone App from the Speed Dial page 500 in ordinary operation is as follows. Each of the five Speed Dial pages has ten speed dial soft buttons that are user assignable. When a speed dial button has been assigned to a speed dial record by the user, it displays the tag or label of the speed dial record and tapping on (activating) that button effects automatic dialing of the corresponding assigned telephone number. Tapping on a speed dial button with no number assigned (e.g. an empty button) effects display of an Edit Speed Dial Button page (described below) that allows the user to generate a speed dial record to be assigned to that button. To move directly from one of the five Speed Dial pages to another the user can tap on one of the page buttons 540, or the physical buttons 120 on the front of the handheld computer 100 can be used to scroll through the Speed Dial pages.

Tapping on the title bar of the Speed Dial page 500 reveals a pull down edit menu (not shown in FIG. 5). Selecting the edit menu effects display of an Edit Speed Dial page (432 in FIG. 4). The lay out of the Edit Speed Dial page is illustrated at 600 in FIG. 6. The Edit Speed Dial page 600 provides the primary basis by which the user can arrange speed dial settings on the Speed Dial pages, edit speed dial records (434 in FIG. 4) and find telephone numbers for assignment to the speed dial buttons (436 in FIG. 4).

The Edit Speed Dial page 600 contains a table 610 of ten "slots" 612 arranged in two columns of five, with each slot 612 corresponding to a button 525 on the Speed Dial page 500. There are notionally five Edit Speed Dial pages 600, one for each of the Speed Dial pages 500. The slots 612 in the table 610 contain the text of the tags or labels for the speed dial records assigned to the corresponding buttons. When in the Edit Speed Dial page view, one of the slots 612 is always "selected", and the user can change the selected slot by tapping on the corresponding position of the table. In the Figures the selected slot is indicated by inverted graphic colors.

Figure 6:
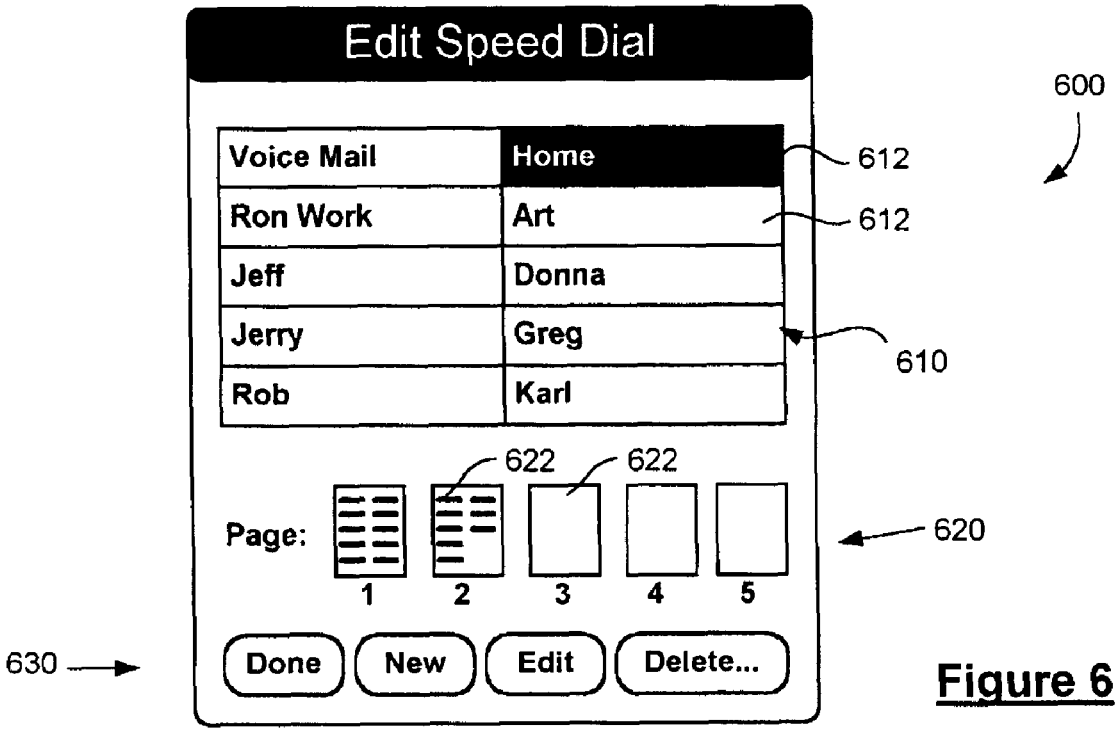
FIG. 6 is a diagram of a first display arrangement for a telephone speed dial editing user interface.

Located below the table 610 is a a set of page button icons 620 that operate in a similar manner to the page buttons 540 and allow the user to navigate amongst the five Edit Speed Dial pages. The page button icons 620, however, are larger than the page buttons 540 of FIG. 5 because the page button icons 620 also display an indication of the speed dial button assignments on each of the Speed Dial pages. This is achieved by small horizontal lines arranged in the page button icons 620 representing speed dial buttons on that page which have speed dial records assigned thereto. For example, as seen in FIG. 6, the Edit Speed Dial 600 has all slots occupied and thus all corresponding speed dial buttons assigned, which is reflected in the "Page 1" icon having ten horizontal lines therein. The "Page 2" icon indicates that the second speed dial page has two "empty" slots/buttons at the lower right positions, whilst the other speed dial pages are shown as all empty. This icon display allows the user to quickly and easily determine which speed dial pages have empty slots/buttons at a glance from the Edit Speed Dial page view, which is particularly useful for editing and rearranging speed dial assignments as will be described in greater detail in a later section.

The Edit Speed Dial page 600 also contains several command buttons 630 for performing specific functions. These command buttons are labeled "Done", "New", "Edit" and "Delete" and will be referred to hereinafter. For example, tapping on the "Done" button returns the Phone App user interface to display the Speed Dial page view (500). The "New", "Edit" and "Delete" buttons, when activated, enable operations to be performed on the speed dial record of the selected slot.

Figure 7:
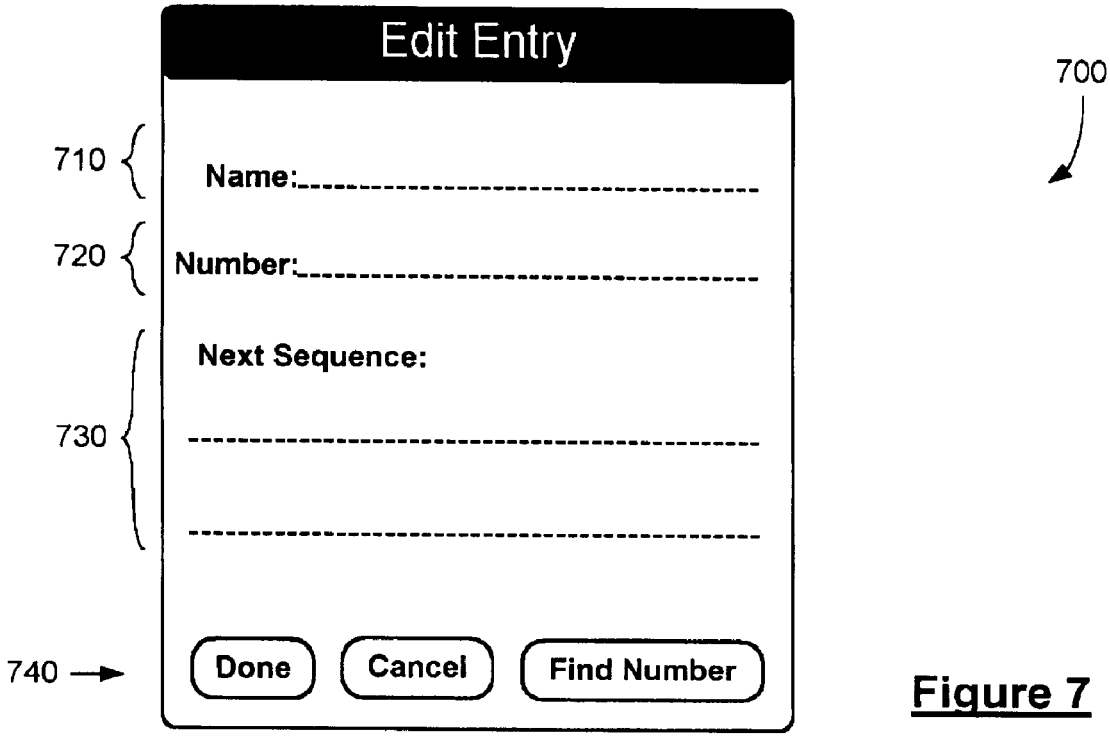
FIG. 7 is a diagram of a second display arrangement for a telephone speed dial editing user interface.

Tapping on the "Edit" command button from the Edit Speed Dial page 600 effects display of an Edit Entry page, the layout of which is illustrated at 700 in FIG. 7. The Edit Entry page 700 displays the data of the speed dial record for the selected slot. In particular, the Edit Entry page has a "Name" field at 710 for displaying and editing the speed dial record tag or label, and a "Number" field at 720 for displaying and editing the telephone number for the speed dial record. The Edit Entry page also has a field labeled "Next Sequence" at 730 which provides for the user to specify a string of characters to be sent by the phone after the dialing procedure. For example, for a particular telephone number corresponding to a PBX extension, the user may specify a string of characters in the "Next Sequence" field for the PBX extension number.

In the Edit Entry page, each of the fields 710, 720 and 730 are editable by the user in conventional manner on the handheld computer system 100. For example, the fields can be edited using the stylus on the touch sensitive screen or using a peripheral keyboard or the like. The Edit Entry page 700 also has several command buttons 740, labeled "Done", "Cancel" and "Find Number". Tapping on the "Done" button causes the Phone App to return to the Edit Speed Dial page, retaining any changes to the speed dial record made by the user. The "Cancel" button effects return to the Edit Speed Dial page whilst discarding any speed dial record changes. The "Find Number" button allows the user to find a telephone number to insert in the "Number" field 720, as described below.

Figure 8:
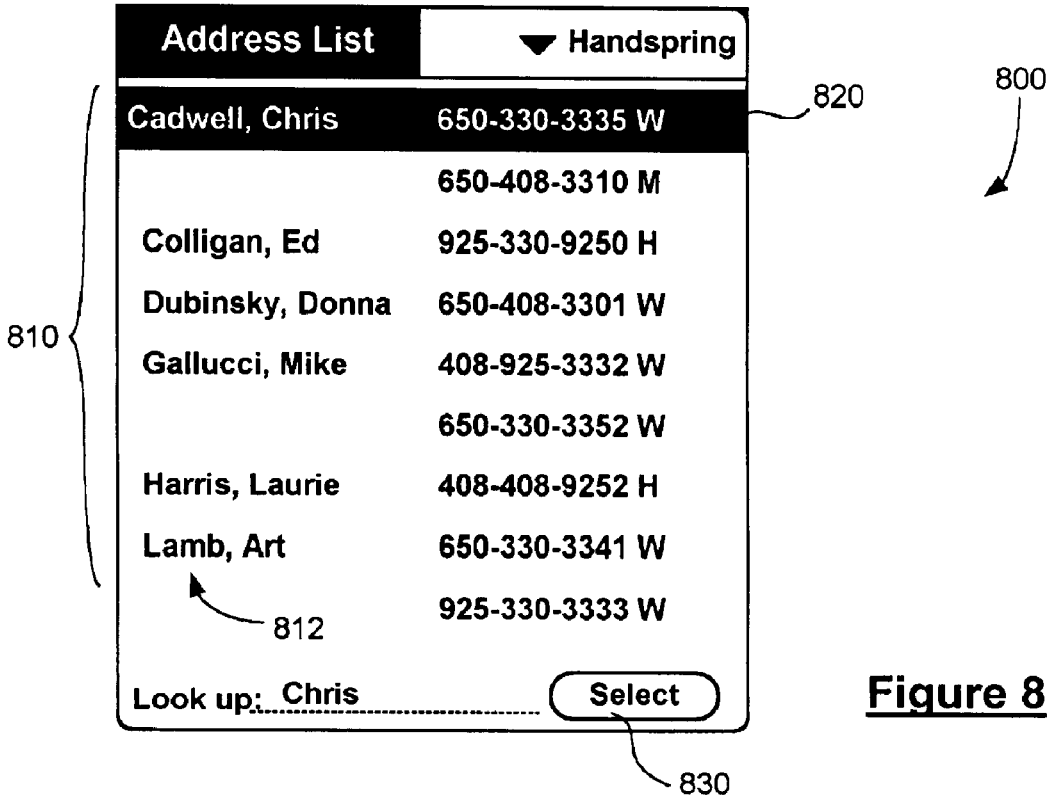
FIG. 8 is a diagram of a third display arrangement for a telephone speed dial editing user interface.

The Phone App has some interaction with other software applications on the handheld computer 100, including an "Address Book" application that the user may employ to keep a list of acquaintances and corresponding addresses, telephone numbers and the like. In use of the Edit Entry page 700, the user may enter a name in the "Name" field and then tap on the "Find Number" button to access data from the Address Book application. In particular, tapping on the "Find Number" button generates a search through the Address Book data to find names matching the text in the "Name" field 710. The results of the search are presented to the user in an Address List page, such as illustrated at 800 in FIG. 8. The Address List page includes a list 810 of names and corresponding telephone numbers retrieved from the Address Book data in the search based on the "Name" field text. The user may then highlight one of the list entries (820) and tap on a "Select" button 830 to return to the Edit Entry page 700 with the selected Address Book data telephone number inserted in the speed dial record "Number" field 720.

FIGS. 9A, 9B, 9C and 9D are block diagrams illustrating telephone speed dial user interface editing procedures based on the pages described hereinabove and illustrated in FIGS. 5, 6, 7 and 8.

Figures 9A, 9B:
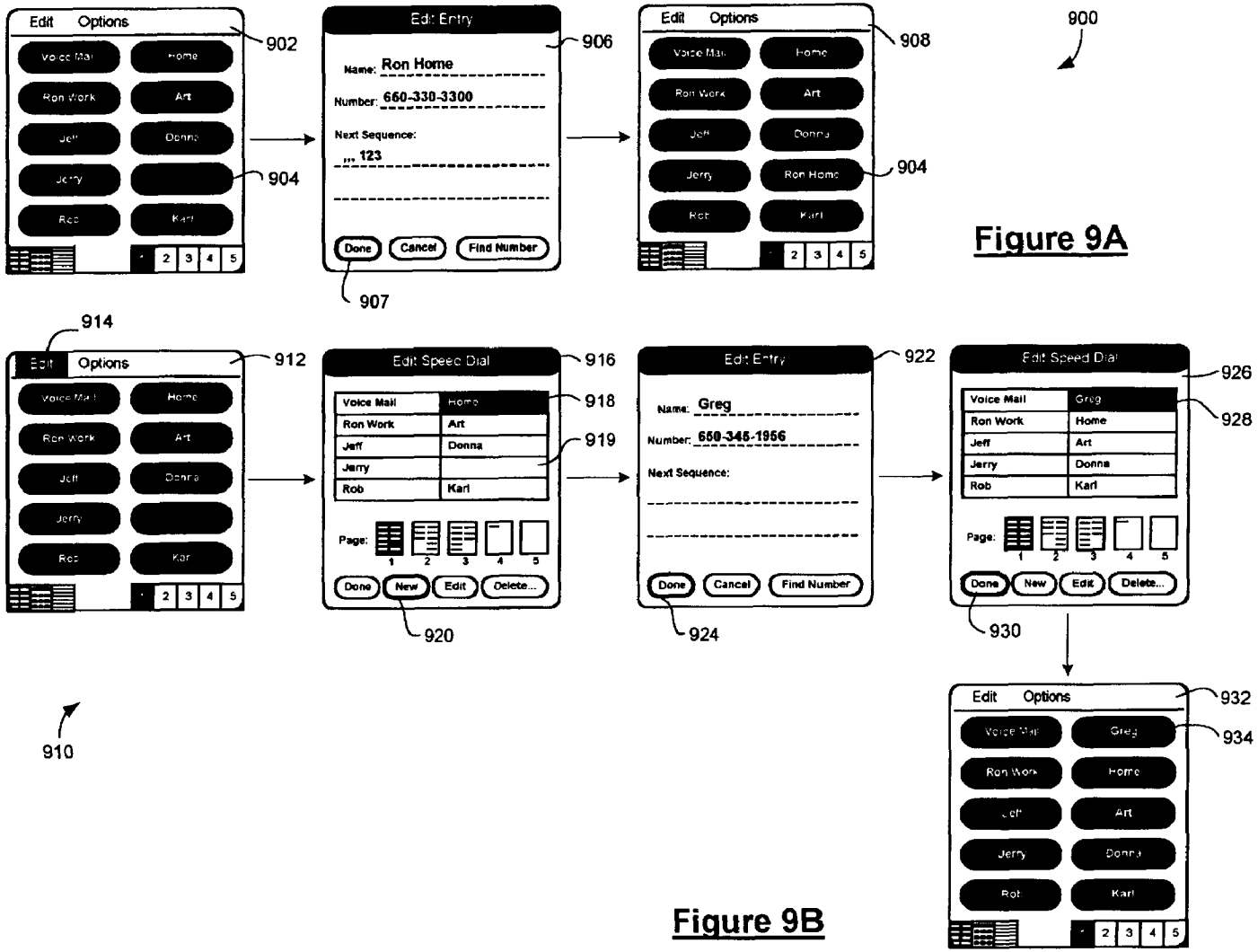
FIGS. 9A, 9B, 9C and 9D are block diagrams illustrating telephone speed dial user interface editing procedures.

An empty button editing procedure 900 is shown in FIG. 9A, beginning from a Speed Dial page 902. The user taps on an empty button (904) which effects transition directly to the Edit Entry page (906). Thereat the user enters data into the "Name", "Number" and optionally "Next Sequence" fields, using conventional data entry means, to create a new speed dial record. Tapping on the "Done" button 907 effects return to the Speed Dial page (906) with the previously empty button 904 now assigned to the new speed dial record. The button 904 now displays the "Name" field text, indicating that it is no longer empty.

A speed dial button insertion procedure is illustrated at 910 in FIG. 9B, beginning from a Speed Dial page 912. The user taps on the title bar of the Speed dial page and selects the revealed "Edit" menu shown at 914. This effects transition of the Phone App to an Edit Speed Dial page 916 corresponding to the Speed Dial page 912. The user selects one of the slots (918) on the Edit Speed Dial page 916 at which to insert a new entry, and taps the "New" command button 920. If the selected slot is currently occupied, an empty slot on the same page is located (919) and records between the selected and empty slots are shifted so as to clear the selected slot. If no slot is available on the current page, then a beep sounds, indicating that the operation is not possible. If the slot is successfully cleared (or if the slot was empty to begin with), the Edit Entry page 922 is then presented, allowing the user to enter data for a new speed dial record as described previously. The user taps on the "Done" button 924 at the completion of the speed dial record creation to effect return to the Edit Speed Dial page as shown at 926. The selected slot 928 now contains the newly created speed dial record, and the previously empty slot is now occupied by one of the shifted existing records. Tapping on the "Done" button effects return to the corresponding Speed Dial page (932), where the new speed dial record tag or label is displayed on the button 934.

Figure 9C:
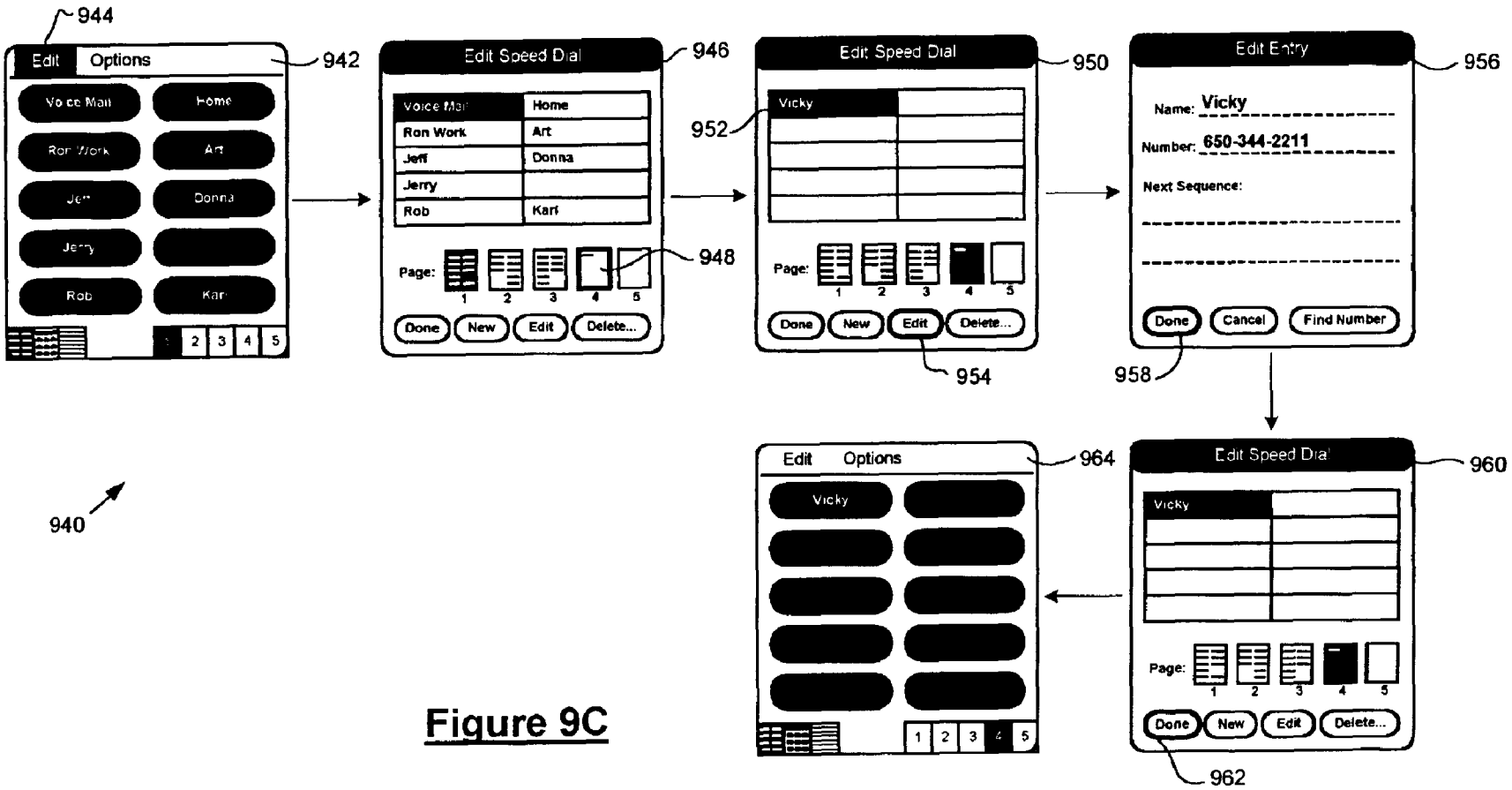

A speed dial record editing procedure is illustrated at 940 in FIG. 9C, beginning from a Speed Dial page 942. The user obtains the corresponding Edit Speed Dial page 946 through selection of the "Edit" menu 944. In this case the user selects a different Edit Speed Dial page (950) by tapping on the page icon 948. An occupied slot 952 on page 950 is selected, and tapping on the "Edit" button 954 effects transition to the Edit Entry page (956) containing the speed dial record data for the selected slot. The user is then able to amend the speed dial record data if desired, and tap the "Done" button to enter the amended record. The effects return to the Edit Speed Dial page as shown at 960. Tapping on the "Done" button 962 returns the Phone App user interface to the corresponding Speed Dial page (964).

Figure 9D:
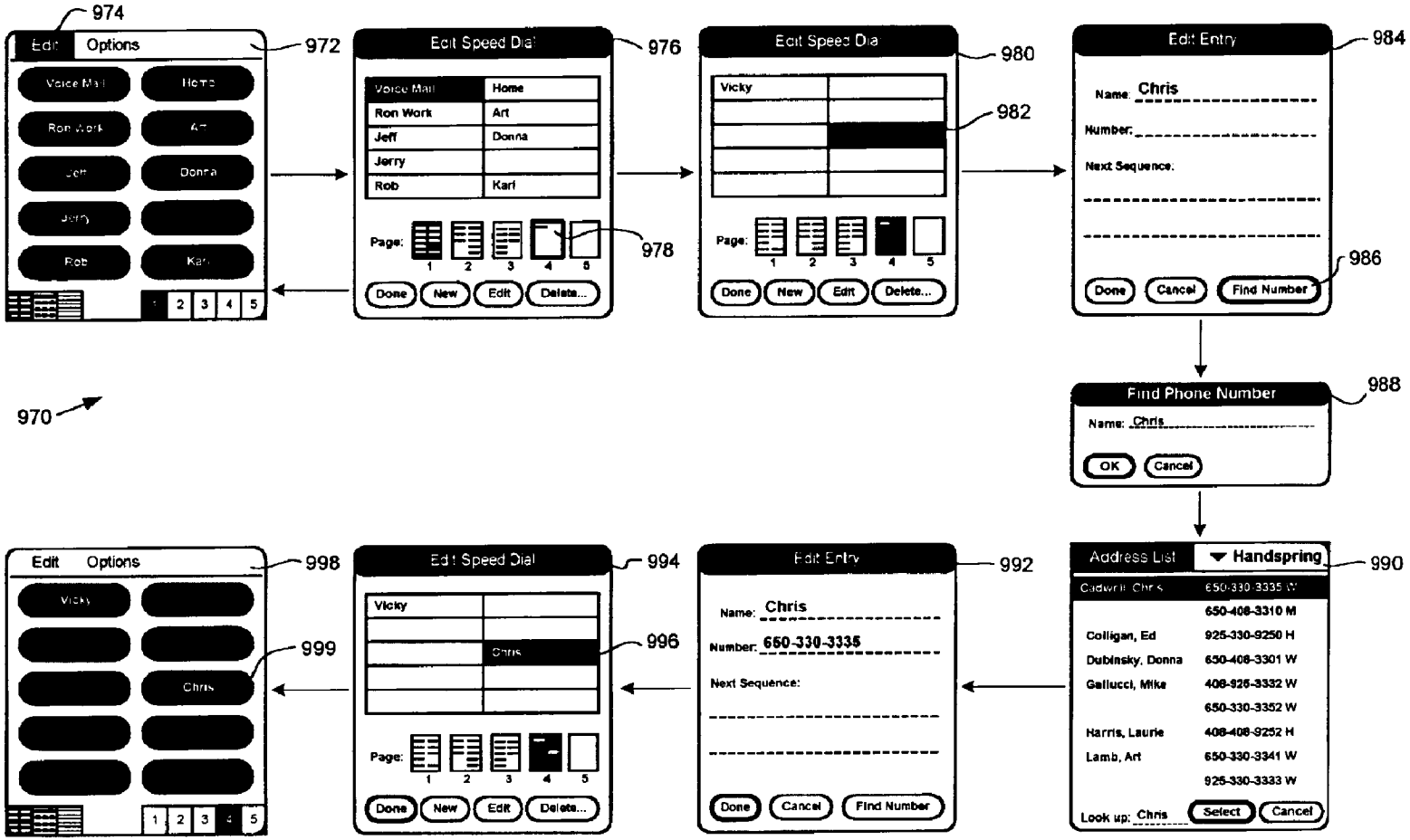

An alternative new speed dial record creation procedure is illustrated at 970 in FIG. 9D, beginning at Speed Dial page 972. In the illustrated procedure the user selects the "Edit" menu 974 to reach the Edit Speed Dial page 976. As shown, the user then taps a page icon button 978 to reach a desired Edit Speed Dial page 980, and thereat selects an empty slot 982. Using the "Edit" or "New" command button effects transition to the Edit Entry page 984. An acquaintance name is entered in the "Name" field and the "Find Number" button 986 activated to locate a telephone number for the acquaintance in the Address Book data file. A Find Phone Number dialog 988 appears to confirm the name under which to search, which leads to an Address List page 990 containing the search results. As described previously, the user can then select an item from the list of names and telephone numbers which causes a return to the Edit Entry page (992) with the relevant telephone number entered in the "Number" field. The newly created speed dial record is entered into the selected slot (996) in the Edit Speed Dial page (994) when the user taps the "Done" button. Finally, tapping the "Done" button on the Edit Speed Dial page effects return to the Speed Dial page as seen at 998 with the new speed dial record assignment indicated on the button 999.

One of the advantages of the speed dial system of the described embodiment is that the user may use the positioning of the speed dial buttons to remember which buttons correspond to which acquaintance. For example, the user may assign the speed dial numbers to the buttons in order that they may be recalled by button position, e.g. remembering Rob's mobile telephone number is the bottom left-hand button. This form of positional memory recall is something that many people find particularly easy and convenient, oftentimes easier than recalling even a short numerical code or the like. Also, the speed dial numbers are arranged in a plurality of pages, so that each page may be used for speed dial numbers in a different category, for instance. One page may contain work related telephone numbers, for example, another page family numbers and another page telephone numbers for friends. The button icons on the Speed Dial page representing the different pages of buttons are also arranged to exploit the user's position recall memory.

Once the speed dial records have been created and entered into the speed dial system as described above, their assignment to buttons on the Speed Dial pages can be rearranged by a "drag and drop" operation using the stylus on the touch sensitive screen of the handheld computer. In the Edit Speed Dial page a speed dial record slot is selected by placing the stylus tip thereon, and that record can be relocated to another slot on the same page by dragging the stylus tip over to the position of the new slot. If the slot new slot is empty, the speed dial record is moved to the new slot when the stylus is lifted. If the new slot is already occupied, however, a rearrangement of some of the other speed dial records on the page is also required.

If there is an empty slot immediately below the occupied destination slot, the record currently occupying the slot is moved down one position to the empty slot. FIG. 10A illustrates such a rearrangement operation.

If the slot immediately below the destination slot is occupied, all the records below the destination slot are shifted down until an empty slot is found and filled. Note that the empty slot may be the one just vacated. For purposes of this description, the right hand column is considered "below" the left-hand column. Rearrangement operations of this kind are illustrated in FIGS. 10B and 10C.

If the user drags a speed dial record from a slot 612 on the Edit Speed Dial page 600 to an un-selected page icon 622, that page icon becomes selected (inverted). Upon lifting the stylus in that condition, the selected record is placed in the first available slot on the new page. If there are no empty slots on the new page, that page's icon does not invert, and a beep sounds when the user lifts the pen from that location, indicating that the user cannot drag to that page. If a record is successfully moved to a new page, the new page is displayed upon pen up.

In order to facilitate user memorization of speed dial buttons by position, maintaining the position of a speed dial button within a certain page is considered important. That is why the relative positioning of speed dial buttons on a page is preserved where possible, and speed dial records are not permitted to shift across page boundaries when entries are automatically rearranged during drag-and-drop operations and insertion of new records.

Whilst the application of the principles of the present invention have been described hereinabove in connection with a telephone speed dialing system on a handheld computer, the invention also finds other applications. For example, the actionable addresses assigned to the buttons need not be telephone numbers and may be Internet addresses instead. In that case the invention can be implemented to provide access to Internet "bookmarks" instead of telephone numbers. To enable full benefit, then, the computer should include the capability of communication with the Internet, which can be achieved through the telephone peripheral, or through alternative communications circuitry as known in the art. Such functionality may be accessible through a browser application on the handheld computer, whereby tapping a "bookmark" button, causes the browser to display a page or the like from the selected Internet address. Similarly, the addresses associated with the "speed dial" buttons may, in another implementation, provide actionable pointers to software applications accessible by the computer system. In that case tapping a button may effect launching of the corresponding software application on the handheld computer.

The foregoing has described a method and apparatus for organizing addressing elements. It is contemplated that changes and modifications may be made by one of ordinary skill in the art, to the materials and arrangements of elements of the present invention without departing from the scope of the invention.

We claim:

1. A method for enabling user-configurable access to actionable addresses in a computer system, said computer system having a screen for displaying iconographic data and text, said computer system also having a user input device enabling a user to interact with the computer system using components displayed on the screen, the method comprising:

displaying a first of a plurality of action pages on the screen, each action page having a plurality of activatable elements in a pre-defined layout comprising a plurality of editable positions on said screen, each activatable element may be assigned correspondence with a user defined label displayed with the activatable element and a user defined actionable address;

displaying action page icons associated with other action pages in said plurality of action pages on the screen of the first action page, said action page icons illustrating a miniaturized view of said activatable elements in said pre-defined layout of editable positions on an associated action page, displaying said associated action page in response to a user input through said user input device selecting one of said action page icons; and in response to moving of a selected one of said activatable elements on said first action page to a selected action page icon by a user through said user input device, removing the selected activatable element from said first action page and placing said selected activatable element into a next available editable position on an action page associated with said selected action page icon.

2. The method as claimed in claim 1 wherein the computer system comprises a handheld computer system with a touch sensitive display screen that acts as said screen and said user input device.

3. The method as claimed in claim 1 wherein the assignment of labels and actionable addresses with activatable elements is user definable, such that the assignments can, by action of the user input device, be reassigned between activatable elements on the same page and between activatable elements on different pages.

4. The method as claimed in claim 1 wherein moving of said selected one of activatable elements on said action page is achieved by a drag-and-drop operation.

5. The method as claimed in claim 1 wherein said computer system includes a telephone.

6. The method as claimed in claim 5 wherein said actionable addresses comprise telephone numbers, and an activation of the actionable address comprises dialing the telephone number assigned to the selected activatable element.

7. The method as claimed in claim 1 wherein the computer system is equipped for communication with the Internet, and said actionable addresses comprise Internet addresses, wherein an activation of the actionable address comprises accessing the Internet address assigned to the selected activatable element.

8. The method as claimed in claim 1, wherein said actionable addresses correspond to software applications in said computer system, wherein an activation of the actionable address comprises initiating execution of the software application assigned to the selected activatable element.

9. The method as claimed in claim 1 wherein said predefined layout comprising said plurality of editable positions comprises a rectangular grid of editable positions.

10. A handheld computer system, said handheld computer system comprising:

a processor, a screen display, a user input device and communications circuitry all coupled to inter-operate with one another;

a graphical user interface comprising a plurality of action pages for display on the screen, each action page having a plurality of activatable screen elements in a predefined layout comprising a plurality of editable positions with each screen element having a user assignable to a label that is displayed with the screen element and an actionable address that is executed upon activation of the screen element using the user input device, and a plurality of action page icons, each of said action page icons having an associated action page, said action page icons illustrating a miniaturized view of said activatable elements in said pre-defined layout of editable positions on said associated action page, said handheld computer system displaying an associated action page in response to a user selection of one of said action page icons; and a screen element movement handling routine, said removing a selected screen element from a displayed action page and placing said selected screen element into a next available editable position on an action page associated with a selected action page icon in response to user input moving said selected screen element on said displayed action page to a selected action page icon with said user input device.

11. The handheld computer system as claimed in claim 10 wherein said screen display and said user input device comprise a touch sensitive screen.

12. The handheld computer system as claimed in claim 11, wherein each of said activatable screen elements comprises a button display on the touch sensitive screen that is capable of activation by the press of a finger of the user so as to execute the corresponding actionable address.

13. The handheld computer system as claimed in claim 11 wherein the moving of said selected screen element is achieved by a drag-and-drop operation.

14. The handheld computer system as claimed in claim 10, wherein said communications circuitry includes a telephone, and wherein said actionable addresses comprise telephone numbers, and an activation of the actionable address comprises dialing the telephone number assigned to the selected activatable element.

15. The handheld computer system as claimed in claim 10, wherein the communications circuitry includes circuitry for communication with the Internet, and said actionable addresses comprise Internet addresses, wherein an activation of the actionable address comprises accessing the Internet address assigned to the selected activatable element.

16. The handheld computer system as claimed in claim 10, wherein said actionable addresses correspond to software applications in said computer system, wherein an activation of the actionable address comprises initiating execution of the software application assigned to the selected activatable element.

17. The handheld computer system as claimed in claim 10 wherein said pre-defined layout comprising said plurality of editable positions comprises a rectangular grid of editable positions.

*18. A method for enabling user-configurable access to actionable addresses in a computer system, said computer system having a screen for displaying data and text, said computer system also having a user input device enabling a user to interact with the computer system using components displayed on the screen, the method comprising:*

*providing for display a first of a plurality of action pages, each action page having a plurality of activatable elements in a pre-defined layout comprising a plurality of editable positions on said screen, each activatable element may be assigned correspondence with a user defined actionable address;*

*providing for display action page icons associated with other action pages in said plurality of action pages on the screen of the first action page, said action page icons illustrating a miniaturized view of said activatable elements in said pre-defined layout of editable positions on an associated action page, displaying said associated action page in response to a user input through said user input device selecting one of said action page icons; and*

*in response to moving of a selected one of said activatable elements on said first action page to a selected action page icon by a user through said user input device, removing the selected activatable element from said first action page and placing said selected activatable element into a next available editable position on an action page associated with said selected action page icon.*

*19. The method as claimed in claim 18, wherein the computer system comprises a handheld computer system with a touch sensitive display screen that acts as said screen and said user input device.*

*20. A mobile computing device, said mobile computing device comprising:*

*a processor, a screen display, a user input device and communications circuitry all coupled to inter-operate with one another;*

*a graphical user interface comprising a plurality of action pages for display, each action page having a plurality of activatable screen elements in a pre-defined layout comprising a plurality of editable positions with each screen element having a user assignable to an actionable address that is executed upon activation of the screen element using the user input device, and*

*a plurality of action page icons, each of said action page icons having an associated action page, said action page icons illustrating a miniaturized view of said activatable elements in said pre-defined layout of editable positions on said associated action page, said mobile computing device displaying an associated action page in response to a user selection of one of said action page icons; and a screen element movement handling routine, said removing a selected screen element from a displayed action page and placing said selected screen element into a next available editable position on an action page associated with a selected action page icon in response to user input moving said selected screen element on said displayed action page to a selected action page icon with said user input device.*

*21. The mobile computing device as claimed in claim 20, wherein said screen display and said user input device comprise a touch sensitive screen.*

* * * * *

UNITED STATES PATENT AND TRADEMARK OFFICE

CERTIFICATE OF CORRECTION

PATENT NO. : RE42,268 E
APPLICATION NO. : 11/496089
DATED : April 5, 2011
INVENTOR(S) : Jeffrey Charles Hawkins et al.

It is certified that error appears in the above-identified patent and that said Letters Patent is hereby corrected as shown below:

On the cover page, item (73), Assignee, column 1, line 1, delete "Hewlett-Packard Company" and insert --Hewlett-Packard Development Company, L.P.-- therefore.

Signed and Sealed this
Twenty-seventh Day of November, 2012

David J. Kappos

David J. Kappos
*Director of the United States Patent and Trademark Office*